(12) United States Patent
Shin et al.

(10) Patent No.: US 11,776,724 B2
(45) Date of Patent: Oct. 3, 2023

(54) SWITCH APPARATUS

(71) Applicants: Hyundai Motor Company, Seoul (KR); Kia Corporation, Seoul (KR); Alps Electric Korea Co., Ltd., Gwangju (KR)

(72) Inventors: Sang Hoon Shin, Hwaseong-si (KR); Hoo Sang Lee, Gwangju (KR); Jong Hyun Choi, Gwangju (KR); Dae Woo Park, Gwangju (KR); Youn Tak Kim, Gwangju (KR); Nam I Jo, Gwangju (KR)

(73) Assignees: HYUNDAI MOTOR COMPANY, Seoul (KR); KIA CORPORATION, Seoul (KR); ALPS ELECTRIC KOREA CO., LTD., Gwangju (KR)

( * ) Notice: Subject to any disclaimer, the term of this patent is extended or adjusted under 35 U.S.C. 154(b) by 0 days.

(21) Appl. No.: 17/826,558

(22) Filed: May 27, 2022

(65) Prior Publication Data
US 2023/0110130 A1 Apr. 13, 2023

(30) Foreign Application Priority Data
Oct. 13, 2021 (KR) .................. 10-2021-0136076

(51) Int. Cl.
*H01H 47/00* (2006.01)
*H01F 7/06* (2006.01)
*H01F 7/20* (2006.01)

(52) U.S. Cl.
CPC ............ *H01F 7/064* (2013.01); *H01F 7/206* (2013.01)

(58) Field of Classification Search
None
See application file for complete search history.

(56) References Cited

U.S. PATENT DOCUMENTS

| | | | |
|---|---|---|---|
| 6,811,236 B1 * | 11/2004 | Spong | F25D 23/028 49/276 |
| 9,021,911 B2 | 5/2015 | Kim | |
| 10,503,216 B2 | 12/2019 | Weldon et al. | |
| 2015/0027493 A1 | 1/2015 | Baek et al. | |
| 2015/0234427 A1 * | 8/2015 | Schmidt | G06F 1/1632 361/679.43 |

FOREIGN PATENT DOCUMENTS

| | | |
|---|---|---|
| JP | 2021-012062 A | 2/2021 |
| KR | 10-1573583 B1 | 12/2015 |
| KR | 10-2016-0063614 A | 6/2016 |
| KR | 10-2016-0139729 A | 12/2016 |
| KR | 10-2022-0097696 A | 7/2022 |

* cited by examiner

*Primary Examiner* — Stephen W Jackson

(57) ABSTRACT

A switch apparatus includes a base module including a base case; a manipulation module including a manipulation case, and a grip mounted on an external circumferential surface of the manipulation case; a magnetic mechanism including a base-side magnetic unit provided to the base module, and a manipulation-side magnetic unit provided to the manipulation module; and a grip force sensing unit provided between the manipulation case and the grip, wherein the grip force sensing unit detects whether a grip force applied to the grip is greater than or equal to a predetermined threshold, and the magnetic mechanism is configured to vary a magnetic force generated between the base-side magnetic unit and the manipulation-side magnetic unit in accordance with a magnitude of the grip force detected by the grip force sensing unit.

18 Claims, 10 Drawing Sheets

SWITCH APPARATUS

CROSS-REFERENCE TO RELATED APPLICATION

The present application claims priority to Korean Patent Application No. 10-2021-0136076, filed on Oct. 13, 2021, the entire contents of which is incorporated herein for all purposes by this reference.

BACKGROUND OF THE PRESENT DISCLOSURE

Field of the Present Disclosure

The present disclosure relates to a switch apparatus, and more particularly, to a switch apparatus including a manipulation module which may be intuitively attached to and released from a base module depending on the magnitude of a user's force applied to the manipulation module.

Description of Related Art

A vehicle includes switches for performing various functions such as lock/unlock of doors, audio, video, navigation (AVN), heating, ventilation, and air conditioning (HVAC), seat adjustment, and lighting control.

With the rapid progress of electronic control technology, various apparatuses of the vehicle that used to be operated by mechanical methods may be driven by electric/electronic methods for a driver's convenience and safety, and vehicle systems are being advanced and technologically-enhanced.

In recent years, research and development of switches that allow the driver to easily perform various functions of the vehicle have been continuously conducted. For example, as a vehicle seat is rotatable in a passenger compartment of an autonomous vehicle, research is continuing to ensure accessibility and operability of the switches that can perform various functions of the vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a switch apparatus including a manipulation module which may be intuitively attached to and released from a base module depending on the magnitude of a user's force applied to the manipulation module.

According to an aspect of the present disclosure, a switch apparatus may include: a base module including a base case; a manipulation module including a manipulation case, and a grip mounted on an external circumferential surface of the manipulation case; a magnetic mechanism including a base-side magnetic unit provided to the base module, and a manipulation-side magnetic unit provided to the manipulation module; and a grip force sensing unit provided between the manipulation case and the grip. The grip force sensing unit may detect whether a grip force applied to the grip is greater than or equal to a predetermined threshold, and the magnetic mechanism may be configured to vary a magnetic force generated between the base-side magnetic unit and the manipulation-side magnetic unit in accordance with a magnitude of the grip force detected by the grip force sensing unit.

By sensing the grip force applied to the grip of the manipulation module, and varying the magnetic force acting between the manipulation module and the base module depending on the magnitude of the detected grip force, the manipulation module may be intuitively and easily released from the base module.

When the grip force applied to the grip is greater than or equal to the predetermined threshold, the magnetic mechanism may generate a magnetic repulsion between the base-side magnetic unit and the manipulation-side magnetic unit. When the grip force applied to the grip is less than the predetermined threshold, the magnetic mechanism may generate a magnetic attraction between the base-side magnetic unit and the manipulation-side magnetic unit.

By comparing the grip force applied to the grip with the predetermined threshold, the magnetic force generated between the manipulation module and the base module may be varied, and the manipulation module may be easily released from and attached to the base module depending on variations in magnetic force.

The grip force sensing unit may be provided between an internal circumferential surface of the grip and the external circumferential surface of the manipulation case, and the grip may be made of an elastic material.

The grip force sensing unit may include an internal conductive layer attached to the external circumferential surface of the manipulation case, and an external conductive layer attached to the internal circumferential surface of the grip. The external conductive layer may come into contact with the internal conductive layer or be spaced from the internal conductive layer in accordance with the magnitude of the grip force applied to the grip.

For example, when the grip force applied to the grip is greater than or equal to the predetermined threshold, the external conductive layer may come into contact with the internal conductive layer, and accordingly an electric contact signal may be generated between the internal conductive layer and the external conductive layer. When the grip force applied to the grip is less than the predetermined threshold, the external conductive layer may be spaced from the internal conductive layer, and accordingly an electric contact signal may not be generated between the internal conductive layer and the external conductive layer.

The manipulation case may include a recess which is recessed from the external circumferential surface of the manipulation case to a center portion of the manipulation case, and the internal conductive layer may be received in the recess.

As the internal conductive layer is received in the recess provided in the external circumferential surface of the manipulation case, the internal conductive layer may be securely attached to the manipulation case and a spaced state of the internal conductive layer and the external conductive layer may be stably maintained.

The grip force sensing unit may further include an auxiliary printed circuit board (PCB) attached into the recess, the auxiliary PCB may be electrically connected to a PCB of the manipulation module, and the internal conductive layer may be provided on the auxiliary PCB.

The internal conductive layer may be electrically connected to the PCB of the manipulation module through the auxiliary PCB, and the contact signal between the internal conductive layer and the external conductive layer may be stably transmitted to the PCB of the manipulation module.

The auxiliary PCB may be a flexible printed circuit board (FPCB).

As the auxiliary PCB is made of FPCB, it may be easily attached to the external circumferential surface of a manipulation body.

The grip may include a recessed surface provided in the internal circumferential surface thereof, the recessed surface may be offset from the external circumferential surface of the manipulation case, and the external conductive layer may be attached to the recessed surface.

As the external conductive layer is attached to the recessed surface of the grip, a spaced state of the internal conductive layer and the external conductive layer may be stably maintained when the grip force less than the predetermined threshold is applied to the grip.

The grip may further include contact surfaces contacting with the external circumferential surface of the manipulation case, and the contact surfaces may include an upper contact surface connected to a top edge portion of the recessed surface in the grip, and a lower contact surface connected to a bottom edge portion of the recessed surface in the grip.

Because the grip has the upper contact surface and the lower contact surface connected to the top edge portion and bottom edge portion of the recessed surface, respectively, the recessed surface may be easily close to or be spaced from the external circumferential surface of the manipulation case during elastic deformation of the grip.

The grip may further include at least an elastic projection provided on the periphery of the recessed surface. The elastic projections may protrude from the internal circumferential surface of the grip toward the manipulation body.

As the elastic projections are provided on a periphery of the recessed surfaces, the elastic projections may be elastically deformed in accordance with the magnitude of the grip force applied to the grip. When the grip force is removed, the elastic projections may be restored. For example, when no grip force is applied to the grip or the grip force less than the predetermined threshold is applied to the grip, the elastic projections may have a predetermined length to ensure a gap between the internal conductive layer and the external conductive layer.

The internal conductive layer may include a first conductive portion and a second conductive portion symmetrically disposed on the external circumferential surface of the manipulation case, the first conductive portion and the second conductive portion may be physically separated from each other, and the first conductive portion and the second conductive portion may be provided on an external circumferential surface of the auxiliary PCB.

The external conductive layer may have a band shape continuously extending along a circumferential direction of the grip.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
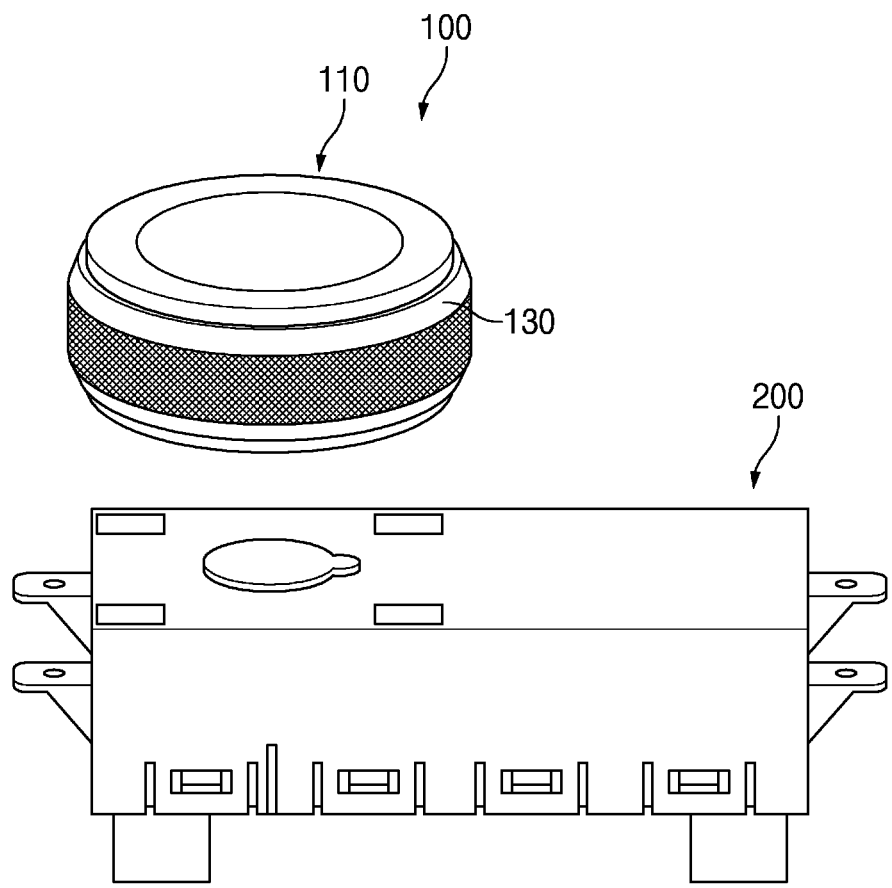
FIG. 1 illustrates a perspective view of a state in which a manipulation module is released from a base module in a switch apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a switch apparatus according to an exemplary embodiment of the present disclosure may include a base module 200, and a manipulation module 100 releasably attached to the base module 200 depending on variations in magnetic force.

The base module 200 may be mounted in various positions of a vehicle. For example, the base module 200 may be mounted on a center console, a door trim, a rear seat console, or the like. The base module 200 may be electrically and/or mechanically connected to various apparatuses and/or systems of the vehicle. For example, the base module 200 may be electrically and/or mechanically connected to various apparatuses and/or systems of the vehicle such as a door latch mechanism, an outside mirror adjustment mechanism, a seat adjustment mechanism, a heating, ventilation, and air conditioning (HVAC) system, and a lighting system.

Figure 2:
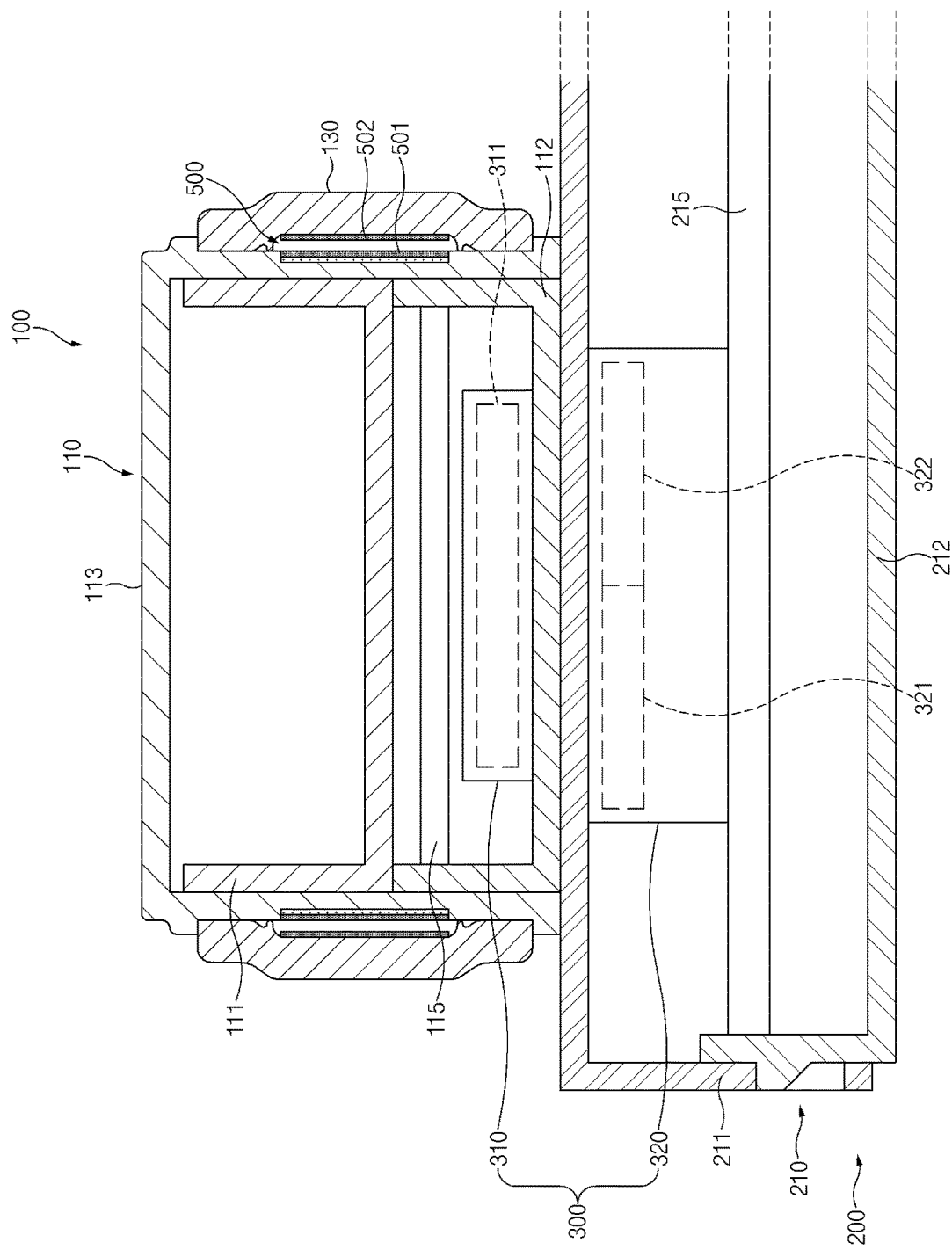
FIG. 2 illustrates a cross-sectional view of a switch apparatus according to an exemplary embodiment of the present disclosure.

Referring to FIG. 2, the base module 200 may include a base case 210, and the base case 210 may include an upper case 211, and a lower case 212 releasably coupled to the upper case 211. A printed circuit board (PCB) 215 may be disposed in the base case 210.

The manipulation module 100 may be connected to the base module 200 through wired communications (serial communications) or wireless communications (Bluetooth, Wi-Fi, Near Field Communications (NFC), etc.). As the manipulation module 100 is manipulated by a user, the operations and functions of various apparatuses and/or systems of the vehicle, such as a door latch mechanism, an outside mirror adjustment mechanism, a seat adjustment mechanism, a heating, ventilation, and air conditioning (HVAC) system, and a lighting system, connected to the base module 200 may be controlled. The manipulation module 100 may be attached to and released from the base module 200 depending on variations in magnetic force.

Referring to FIG. 2, the manipulation module 100 may include a manipulation case 110, and a grip 130 mounted on an external circumferential surface of the manipulation case 110. The manipulation case 110 may include a holder 111 including a cavity in which various components are received, a lower cover 112 disposed under the holder 111, and a manipulation body 113 rotatably supported on an external circumferential surface of the holder 111. The manipulation body 113 may rotate around a rotation axis extending along the center portion thereof. A PCB 115 may be disposed in the manipulation case 110, and the PCB 115 may be received in a cavity of the lower cover 112. The grip 130 may be mounted on an outer circumferential surface of the manipulation body 113, and the grip 130 may be made of an elastic material which is easily deformable and elastically restored such as rubber. For example, when the manipulation body 113 of the manipulation case 110 has a shape of cylinder, the grip 130 may have an annular shape extending along a circumferential direction of the manipulation body 113, and the grip 130 may be disposed to surround the external circumferential surface of the manipulation body 113.

The switch apparatus according to an exemplary embodiment of the present disclosure may include a magnetic mechanism 300 generating a magnetic force between the base module 200 and the manipulation module 100 and varying the magnetic force. For example, the magnetic mechanism 300 may generate a magnetic attraction between the manipulation module 100 and the base module 200, holding the manipulation module 100 attached to the base module 200. Furthermore, the magnetic mechanism 300 may generate a magnetic repulsion between the manipulation module 100 and the base module 200, allowing the manipulation module 100 to be releasable from the base module 200.

Referring to FIG. 2, the magnetic mechanism 300 may include a manipulation-side magnetic unit 310 provided to the manipulation module 100, and a base-side magnetic unit 320 provided to the base module 200. The magnetic mechanism 300 may generate a magnetic force between the manipulation-side magnetic unit 310 and the base-side magnetic unit 320, and vary the generated magnetic force.

The manipulation-side magnetic unit 310 may be mounted in the cavity of the lower cover 112 of the manipulation module 100. The base-side magnetic unit 320 may be mounted in the base case 210 of the base module 200.

Referring to FIG. 2, the manipulation-side magnetic unit 310 may include a permanent magnet 311, and the base-side magnetic unit 320 may include a permanent magnet 321 and an electromagnet 322. There may be always an attractive force acting between the permanent magnet 311 of the manipulation-side magnetic unit 310 and the permanent magnet 321 of the base-side magnetic unit 320. The polarity of the electromagnet 322 may be changed as the direction of current flow is changed. Accordingly, as the polarity of the electromagnet 322 is changed, an attractive or repulsive force may be generated between the permanent magnet 311 of the manipulation-side magnetic unit 310 and the electromagnet 322 of the base-side magnetic unit 320.

Figure 3:
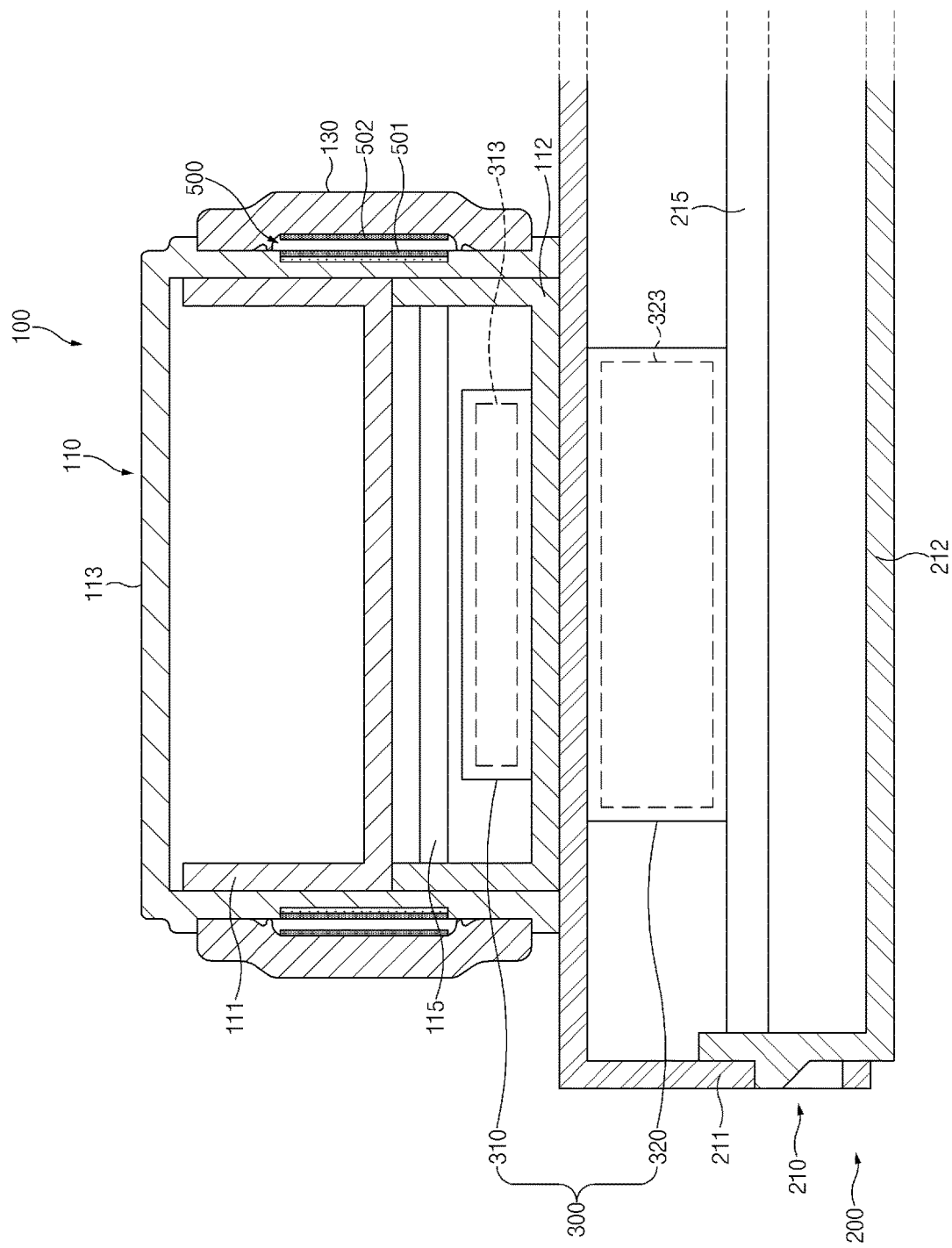
FIG. 3 illustrates a cross-sectional view of a switch apparatus according to another exemplary embodiment of the present disclosure.

Referring to FIG. 3, the manipulation-side magnetic unit 310 may include a permanent magnet 313, and the base-side magnetic unit 320 may include an electromagnet 323. The polarity of the electromagnet 323 may be changed as the direction of current flow is changed. Accordingly, as the polarity of the electromagnet 322 is changed, an attractive or repulsive force may be generated between the permanent magnet 313 of the manipulation-side magnetic unit 310 and the electromagnet 323 of the base-side magnetic unit 320.

Figure 4:
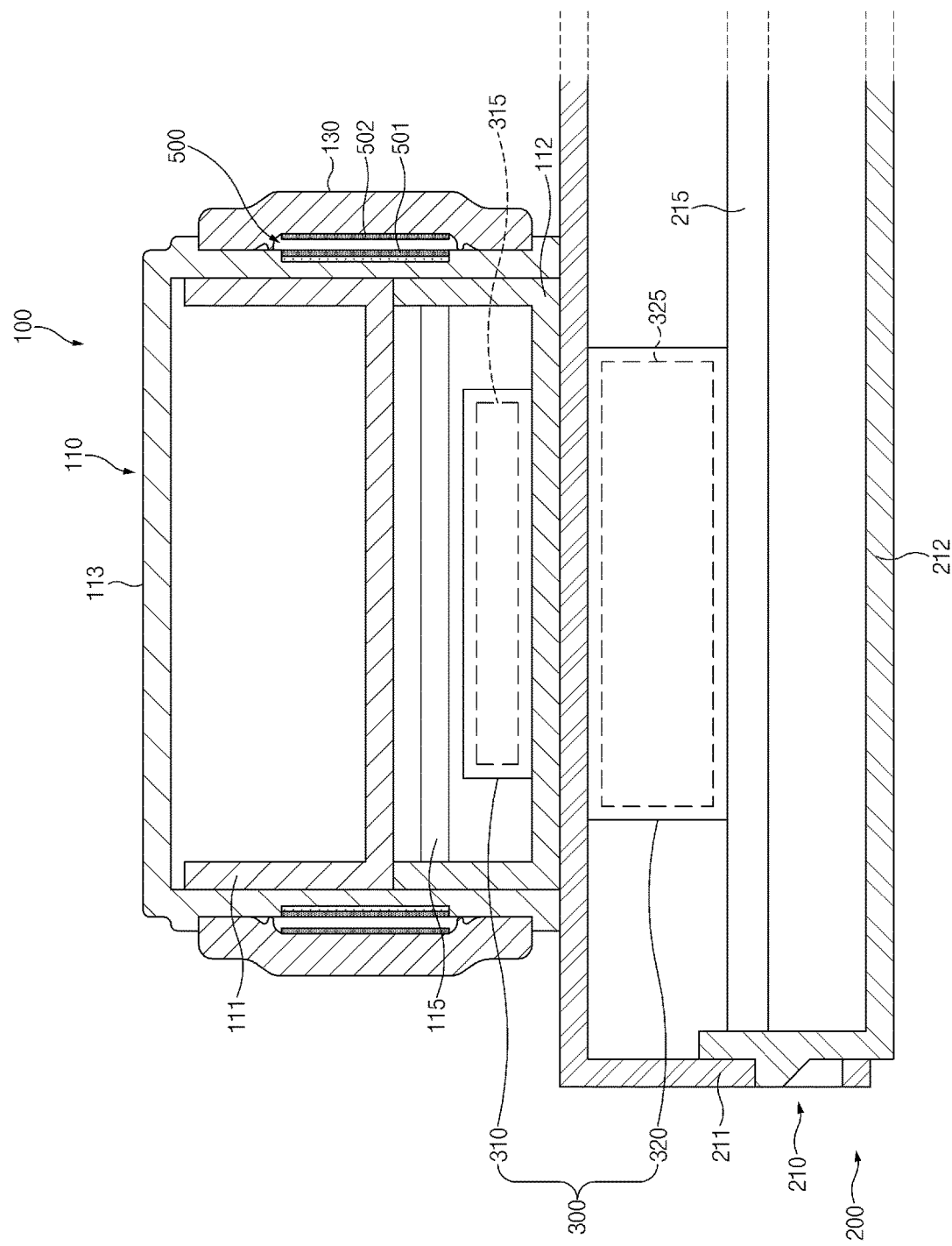
FIG. 4 illustrates a cross-sectional view of a switch apparatus according to another exemplary embodiment of the present disclosure.

Referring to FIG. 4, the manipulation-side magnetic unit 310 may include an electromagnet 315, and the base-side magnetic unit 320 may include a permanent magnet 325. The polarity of the electromagnet 315 may be changed as the direction of current flow is changed. Accordingly, as the polarity of the electromagnet 315 is changed, an attractive or repulsive force may be generated between the electromagnet 315 of the manipulation-side magnetic unit 310 and the permanent magnet 325 of the base-side magnetic unit 320.

The magnetic mechanism 300 may be configured to vary the magnitude of the magnetic force generated between the manipulation-side magnetic unit 310 and the base-side magnetic unit 320. The manipulation module 100 may be easily attached to or released from the base module 200 depending on the magnitude of the magnetic force generated between the manipulation-side magnetic unit 310 and the base-side magnetic unit 320.

The magnetic force generated between the manipulation-side magnetic unit 310 and the base-side magnetic unit 320 may be the sum of the attractive force generated between the manipulation-side magnetic unit 310 and the base-side magnetic unit 320, the repulsive force generated between the manipulation-side magnetic unit 310 and the base-side magnetic unit 320, and the weight of the manipulation module 100 itself.

When the magnetic force generated between the manipulation-side magnetic unit 310 and the base-side magnetic unit 320 is greater than or equal to a predetermined reference magnetic force (attractive force to attach the manipulation module to the base module), sufficient attractive force may act between the manipulation-side magnetic unit 310 and the base-side magnetic unit 320, holding the manipulation module 100 attached to the base module 200.

When the magnetic force generated between the manipulation-side magnetic unit 310 and the base-side magnetic unit 320 is less than the reference magnetic force, the magnetic force may not act between the manipulation module 100 and the base module 200 or the repulsive force may act therebetween, allowing the manipulation module 100 to be easily releasable from the base module 200.

A grip force sensing unit 500 may be provided between an internal circumferential surface of the grip 130 and the external circumferential surface of the manipulation case 110, and the grip force sensing unit 500 may detect a grip force applied to the grip 130.

According to an exemplary embodiment of the present disclosure, the grip force sensing unit 500 may detect whether the grip force applied to the grip 130 is greater than or equal to a predetermined threshold. When the grip force sensing unit 500 detects that the grip force applied to the grip 130 is greater than or equal to the predetermined threshold, a condition (releasable condition) in which the manipulation module 100 is releasable from the base module 200 may be satisfied, and the magnetic mechanism 300 may generate the magnetic repulsion between the base-side magnetic unit 320 and the manipulation-side magnetic unit 310. When the grip force sensing unit 500 detects that the grip force applied to the grip 130 is less than the predetermined threshold, a condition (hold condition or attachment condition) in which the manipulation module 100 remains attached to the base module 200 may be satisfied, and the magnetic mechanism 300 may generate the magnetic attraction between the base-side magnetic unit 320 and the manipulation-side magnetic unit 310.

The grip force sensing unit 500 may include an internal conductive layer 501 attached to the external circumferential surface of the manipulation case 110, and an external conductive layer 502 attached to the internal circumferential surface of the grip 130. The grip 130 may be elastically deformed in accordance with the magnitude of the grip force applied to the grip 130, and accordingly the external conductive layer 502 may come into contact with the internal conductive layer 501 or be spaced from the internal conductive layer 501. When the grip force applied to the grip 130 is greater than or equal to the predetermined threshold, the external conductive layer 502 may come into contact with the internal conductive layer 501, and accordingly an electric contact signal may be generated between the internal conductive layer 501 and the external conductive layer 502. When the grip force applied to the grip 130 is less than the predetermined threshold, the external conductive layer 502 may be spaced from the internal conductive layer 501, and accordingly an electric contact signal may not be generated between the internal conductive layer 501 and the external conductive layer 502.

Figure 5:
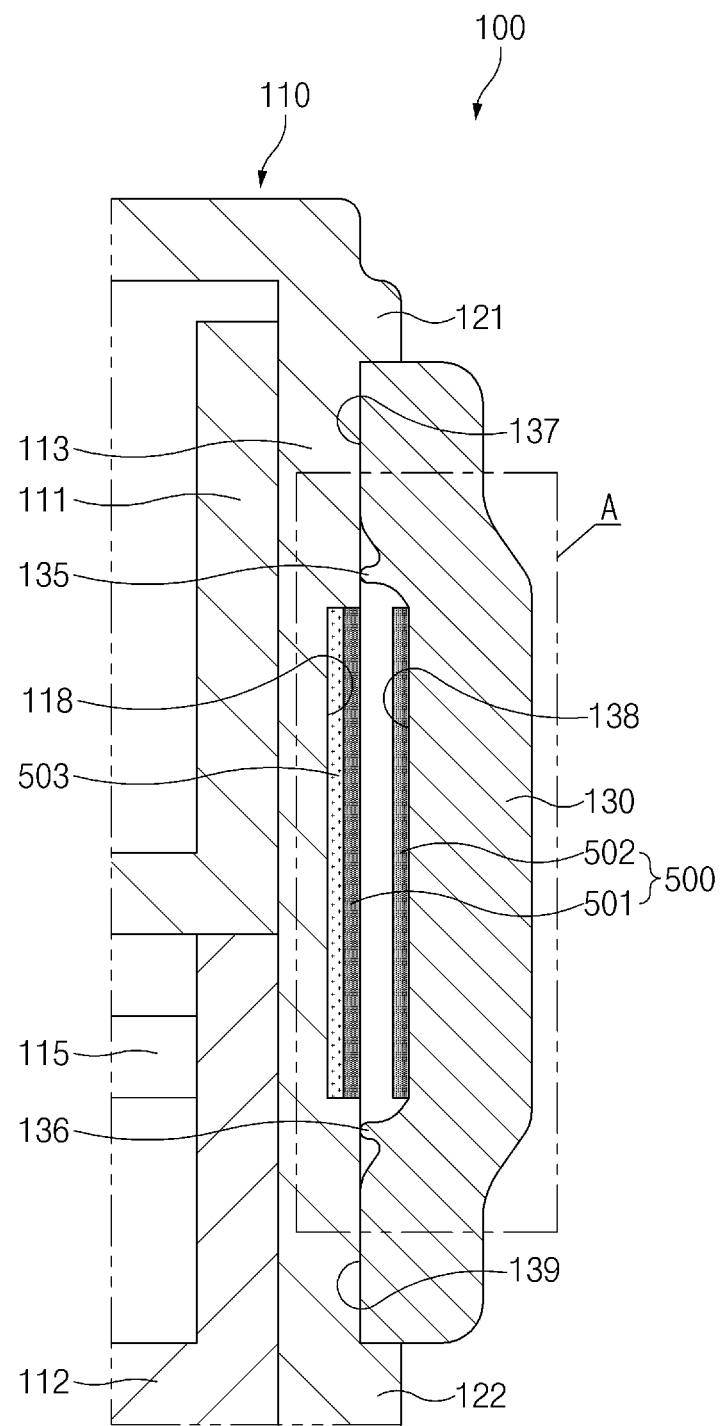
FIG. 5 illustrates a grip force sensing unit mounted on a manipulation module in a switch apparatus according to an exemplary embodiment of the present disclosure.

The internal conductive layer 501 may be attached to the external circumferential surface of the manipulation body 113 of the manipulation case 110. Referring to FIG. 5, the manipulation body 113 may have a recess 118 recessed from the external circumferential surface of the manipulation case to a center portion of the manipulation case, and the recess 118 may extend along the circumferential direction of the manipulation body 113. The internal conductive layer 501 may be received in the recess 118 of the manipulation body 113. As the internal conductive layer 501 is received in the recess 118 provided in the external circumferential surface of the manipulation case 110, the internal conductive layer 501 may be securely attached to the external circumferential surface of the manipulation case 110 and a spaced state of the internal conductive layer 501 and the external conductive layer 502 may be stably maintained.

Furthermore, the manipulation body 113 may include an upper stopper 121 supporting a top edge portion of the grip 130 and a lower stopper 122 supporting a bottom edge portion of the grip 130. Thus, the grip 130 may be stably supported on the external circumferential surface of the manipulation body 113.

Referring to FIG. 5, the grip force sensing unit 500 may further include an auxiliary printed circuit board (PCB) 503 attached into the recess 118 of the manipulation body 113, and the auxiliary PCB 503 may be electrically connected to the PCB 115 of the manipulation module 100 through wires and/or the like. Furthermore, the PCB 115 of the manipulation module 100 may include a pull-up resistor connected to the grip force sensing unit 500. According to an exemplary embodiment of the present disclosure, the auxiliary PCB 503 may be a flexible printed circuit board (FPCB) which is relatively thin and flexible, and an internal circumferential surface of the auxiliary PCB 503 may be easily attached to the external circumferential surface of the manipulation body 113. The internal conductive layer 501 may be provided on an external circumferential surface of the auxiliary PCB 503. For example, the internal conductive layer 501 may be formed on the external circumferential surface of the auxiliary PCB 503 through a patterning process or the like, and accordingly the internal conductive layer 501 and the auxiliary PCB 503 may be a unitary one-piece structure.

Referring to FIG. 5, the grip 130 may have an internal circumferential surface facing the center portion of the manipulation case 110, and an external circumferential surface facing the outside of the manipulation case 110.

The grip 130 may have contact surfaces 137 and 139 and a recessed surface 138 which are provided on the internal circumferential surface thereof. The contact surfaces 137 and 139 may directly contact with the external circumferential surface of the manipulation body 113 of the manipulation case 110, and the recessed surface 138 may be offset from the external circumferential surface of the manipulation body 113 of the manipulation case 110. The recessed surface 138 may be recessed from the internal circumferential surface of the grip 130 toward the external circumferential surface of the grip 130. The recessed surface 138 may extend along a circumferential direction of the grip 130.

The contact surfaces 137 and 139 may be formed to match the external circumferential surface of the manipulation body 113, and the contact surfaces 137 and 139 may include an upper contact surface 137 connected to a top edge portion of the recessed surface 138, and a lower contact surface 139 connected to a bottom edge portion of the recessed surface 138. The top edge portion of the recessed surface 138 may be connected to the upper contact surface 137 through an upper inclined surface 138a, and the bottom edge portion of the recessed surface 138 may be connected to the lower contact surface 139 through a lower inclined surface 138b.

Because the grip 130 has the upper contact surface 137 and the lower contact surface 139 connected to the top edge portion and bottom edge portion of the recessed surface 138, respectively, the recessed surface 138 may be easily close to or be spaced from the external circumferential surface of the manipulation body 113 of the manipulation case 110 during elastic deformation of the grip 130.

The grip 130 may further include one or more elastic projections 135 and 136 provided on the periphery of the recessed surface 138. The one or more elastic projections 135 and 136 may protrude from the internal circumferential surface of the grip 130 toward the manipulation body 113 to maintain a gap between the external conductive layer 502 and the internal conductive layer 501. The elastic projections 135 and 136 may be elastically deformed in accordance with the magnitude of the grip force applied to the grip 130. When the grip force is removed, the elastic projections 135 and 136 may be restored.

Figure 6:
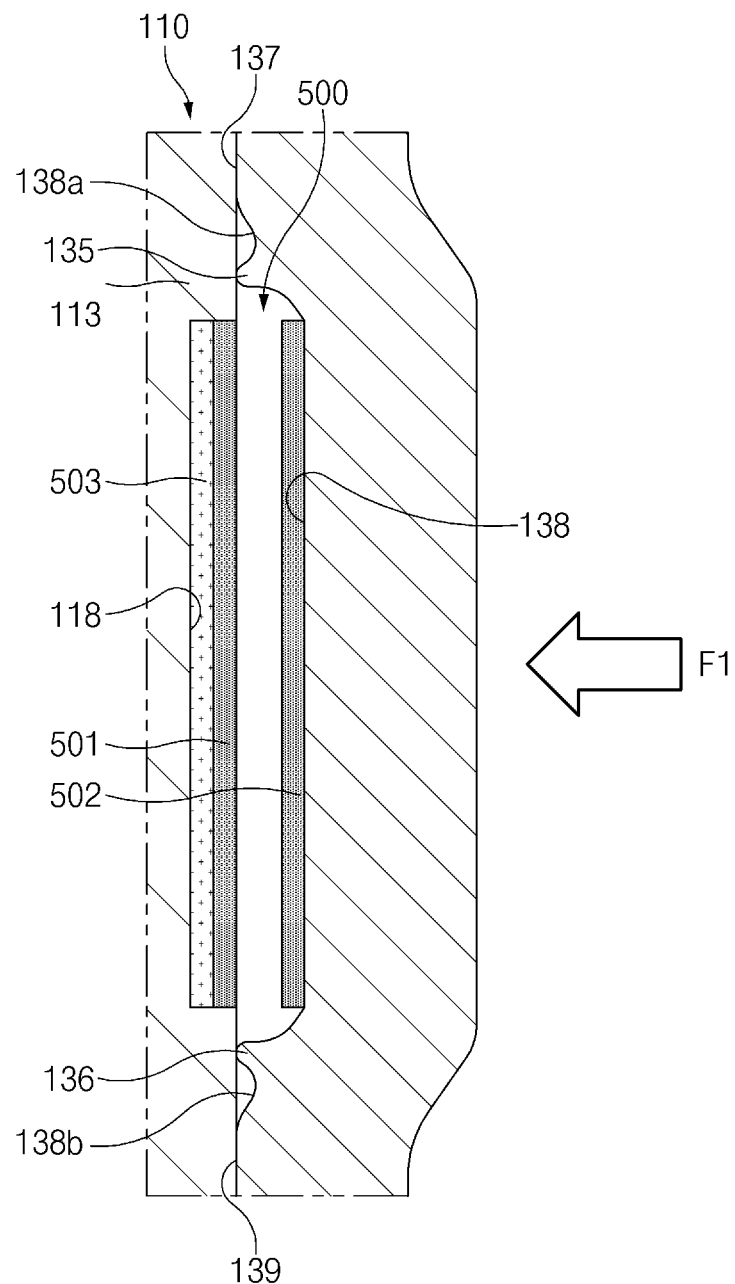
FIG. 6 illustrates an enlarged view of portion A of FIG. 5, in a state in which a first grip force is applied to a grip.

Referring to FIG. 6, an upper elastic projection 135 may protrude from the upper inclined surface 138a toward the manipulation body 113 of the manipulation case 110 by a predetermined length, and a lower elastic projection 136 may protrude from the lower inclined surface 138b toward the manipulation body 113 of the manipulation case 110 by a predetermined length. When no grip force is applied to the grip 130 or a first grip force F1 is applied to the grip 130, the upper elastic projection 135 and the lower elastic projection 136 may have the predetermined length to ensure the gap between the internal conductive layer 501 and the external conductive layer 502. When no grip force is applied to the grip 130 or the first grip force F1 is applied to the grip 130, the external conductive layer 502 may be spaced from the internal conductive layer 501. The first grip force F1 refers to a grip force applied by the user's hand when the manipulation body 113 of the manipulation module 100 is manipulated by the user, and the first grip force F1 may be less than a predetermined threshold. Here, the predetermined threshold may be defined as a predetermined grip force with which a portion of the grip 130 and the elastic projections 135 and 136 are sufficiently deformed and the external conductive layer 502 comes into contact with the internal conductive layer 501.

Figure 7:
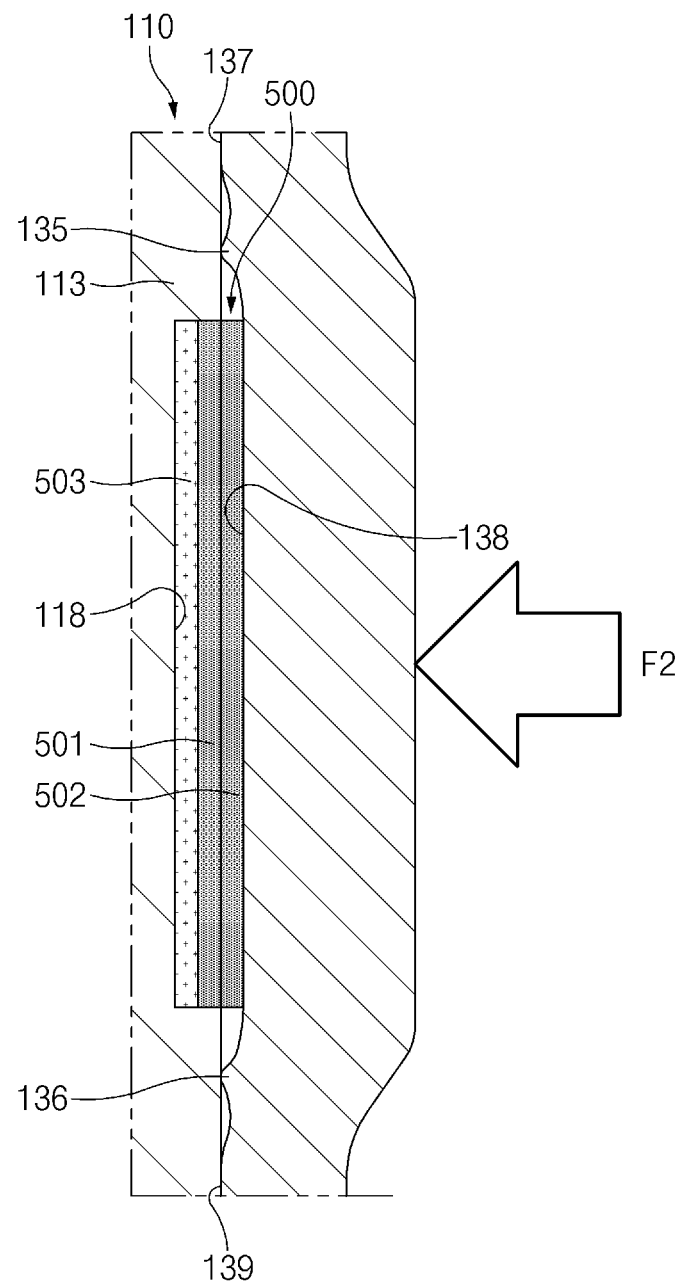
FIG. 7 illustrates a state in which a second grip force is applied to a grip.

Referring to FIG. 7, when a second grip force F2 is applied to the grip 130, the grip 130 may be pressed toward the manipulation body 113 of the manipulation case 110 by the second grip force F2 so that the upper elastic projection 135 and the lower elastic projection 136 may be deformed and the lengths thereof may be reduced. Accordingly, the external conductive layer 502 may come into contact with the internal conductive layer 501. The second grip force F2 refers to a grip force applied by the user's hand to allow the manipulation module 100 to be releasable from the base module 200, and the second grip force F2 may be greater than or equal to the predetermined threshold. The second grip force F2 may be greater than the first grip force F1.

Figure 8:
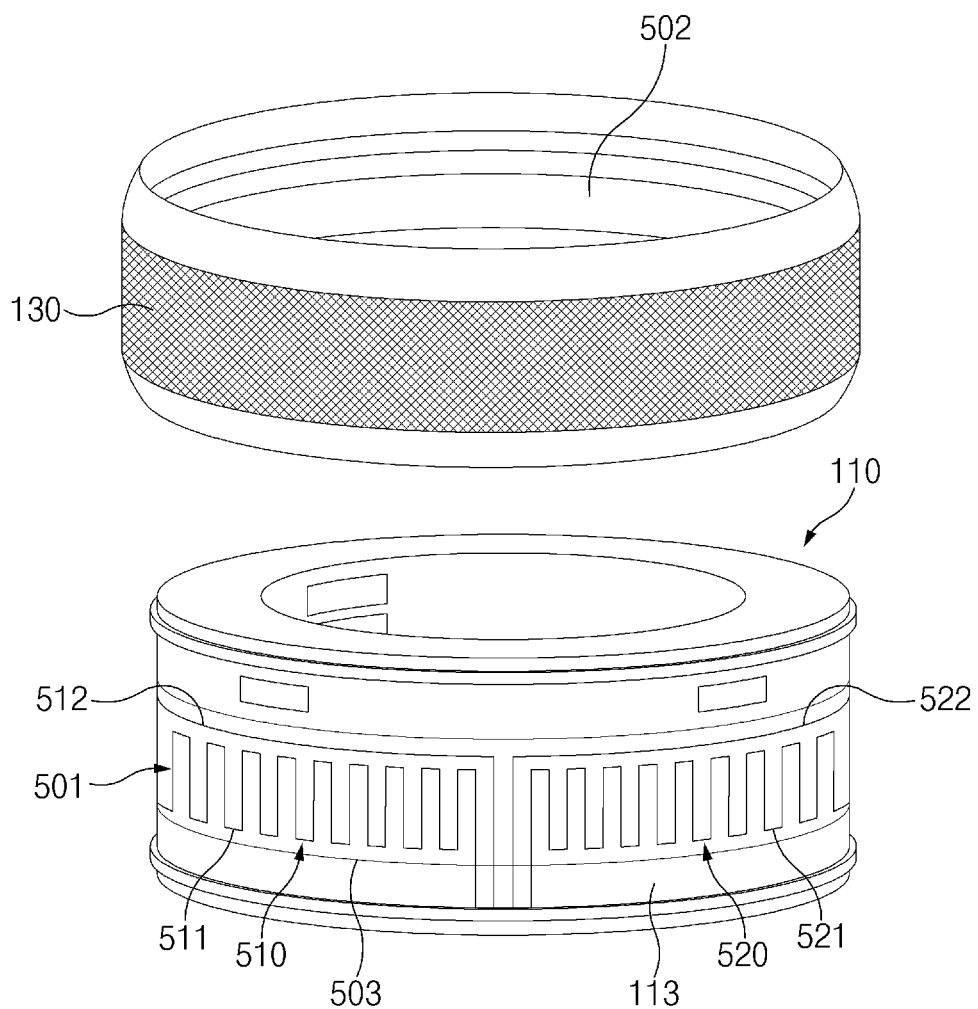
FIG. 8 illustrates a state in which a grip is separated from a manipulation case in a manipulation module of a switch apparatus according to an exemplary embodiment of the present disclosure.

Referring to FIG. 8, the external conductive layer 502 may have a band shape continuously extending along the circumferential direction of the grip 130.

Figure 9:
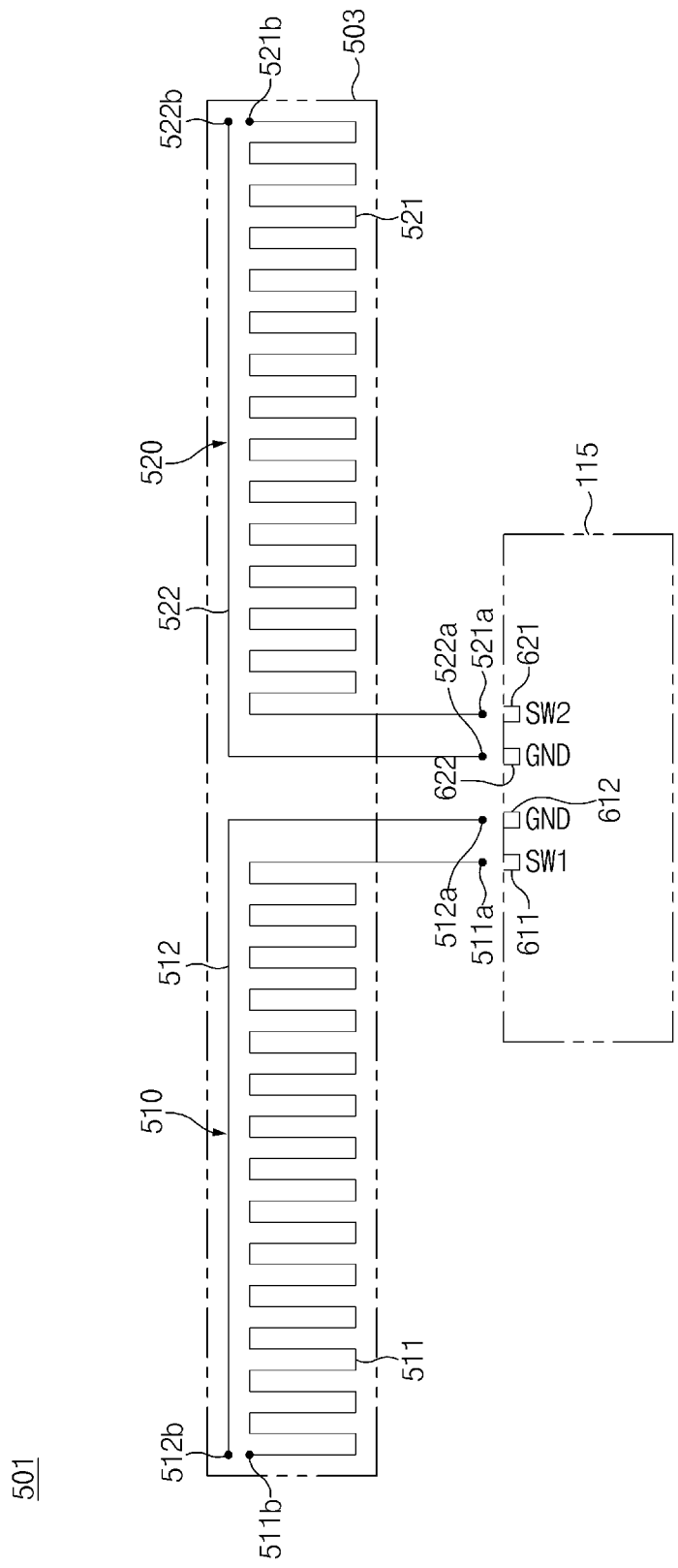
FIG. 9 illustrates the development of an internal conductive layer illustrated in FIG. 8.

Referring to FIG. 8 and FIG. 9, the internal conductive layer 501 may include one or more conductive portions 510 and 520 arranged or extending in the circumferential direction of the manipulation body 113.

FIG. 9 illustrates the development of two conductive portions 510 and 520. Referring to FIG. 9, the internal conductive layer 501 may include a first conductive portion 510 and a second conductive portion 520 symmetrically disposed on the external circumferential surface of the manipulation body 113 of the manipulation case 110. For example, as illustrated in FIG. 8, the first conductive portion 510 may be disposed on a left semicircular portion of the manipulation body 113, and the second conductive portion 520 may be disposed on a right semicircular portion of the manipulation body 113.

The first conductive portion 510 may include a first signal pattern 511 electrically connected to a first switch terminal 611 of the PCB 115, and a first ground pattern 512 electrically connected to a first ground terminal 612 of the PCB 115.

The first signal pattern 511 may include a proximal end portion 511a directly connected to the first switch terminal 611 of the PCB 115, and a distal end portion 511b located farthest from the first switch terminal 611 of the PCB 115. Referring to FIG. 8 and FIG. 9, the first signal pattern 511 may have a zig-zag shape to secure a contact area with the external conductive layer 502.

The first ground pattern 512 may include a proximal end portion 512a directly connected to the first ground terminal 612 of the PCB 115, and a distal end portion 512b located farthest from the first ground terminal 612 of the PCB 115. Referring to FIG. 8 and FIG. 9, the first ground pattern 512 may have an L-shape surrounding at least a portion of the first signal pattern 511. According to another exemplary embodiment of the present disclosure, the first ground pattern 512 may have a zig-zag shape extending along the zig-zag shape of the first signal pattern 511.

The distal end portion 511b of the first signal pattern 511 may be spaced from the distal end portion 512b of the first ground pattern 512, and accordingly the first signal pattern 511 and the first ground pattern 512 may be electrically disconnected before the external conductive layer 502 comes into contact with the first conductive portion 510. When the external conductive layer 502 contacts with the first conductive portion 510, the first signal pattern 511 may be electrically connected to the first ground pattern 512 through the external conductive layer 502.

The second conductive portion 520 may include a second signal pattern 521 electrically connected to a second switch terminal 621 of the PCB 115, and a second ground pattern 522 electrically connected to a second ground terminal 622 of the PCB 115.

The second signal pattern 521 may include a proximal end portion 521a directly connected to the second switch terminal 621 of the PCB 115, and a distal end portion 521b located farthest from the second switch terminal 621 of the PCB 115. Referring to FIG. 8 and FIG. 9, the second signal pattern 521 may have a zig-zag shape to secure a contact area with the external conductive layer 502.

The second ground pattern 522 may include a proximal end portion 522a directly connected to the second ground terminal 622 of the PCB 115, and a distal end portion 522b located farthest from the second ground terminal 622 of the PCB 115. Referring to FIG. 8 and FIG. 9, the second ground pattern 522 may have an L-shape surrounding at least a portion of the second signal pattern 521. According to another exemplary embodiment of the present disclosure, the second ground pattern 522 may have a zig-zag shape extending along the zig-zag shape of the second signal pattern 521.

The distal end portion 521b of the second signal pattern 521 may be spaced from the distal end portion 522b of the second ground pattern 522, and accordingly the second signal pattern 521 and the second ground pattern 522 may be electrically disconnected before the external conductive layer 502 comes into contact with the second conductive portion 520. When the external conductive layer 502 contacts with the second conductive portion 520, the second signal pattern 521 may be electrically connected to the second ground pattern 522 through the external conductive layer 502.

The first conductive portion 510 and the second conductive portion 520 may be physically separated from each other.

As described above, the internal conductive layer 501 may have the two conductive portions 510 and 520 symmetrically disposed on the external circumferential surface of the manipulation body 113 of the manipulation case 110, and when the user grips both left and right sides of the grip 130 symmetrically and uniformly, the external conductive layer 502 may come into contact with the two conductive portions 510 and 520 at the same time. A first controller 150 of the manipulation module 100 and/or a second controller 250 of the base module 200 may receive a first contact signal indicating full contact between the internal conductive layer 501 and the external conductive layer 502 only when all of the first conductive portion 510 and the second conductive portion 520 of the internal conductive layer 501 contact with the external conductive layer 502. When receiving the first contact signal, the first controller 150 of the manipulation module 100 and/or the second controller 250 of the base module 200 may determine that the releasable condition is satisfied.

Furthermore, when the user grips both left and right sides of the grip 130 asymmetrically, the external conductive layer 502 may come into contact with any one of the two conductive portions 510 and 520. The first controller 150 of the manipulation module 100 and/or the second controller 250 of the base module 200 may receive a second contact signal indicating partial contact between the internal conductive layer 501 and the external conductive layer 502 when only one of the first conductive portion 510 and the second conductive portion 520 of the internal conductive layer 501 contacts with the external conductive layer 502. When receiving the second contact signal, the first controller 150 of the manipulation module 100 and/or the second controller 250 of the base module 200 may determine that the hold condition is satisfied.

Figure 10:
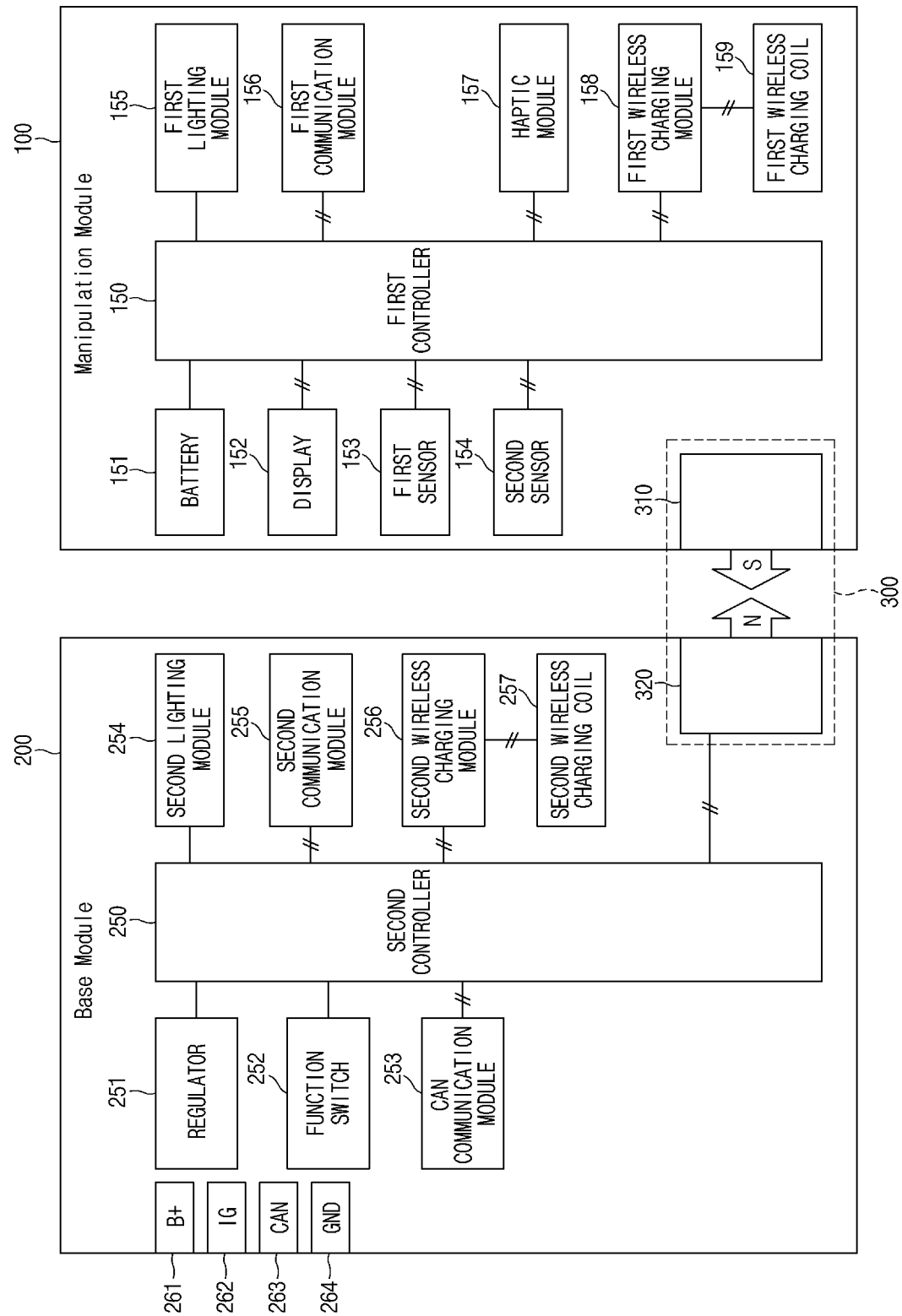
FIG. 10 illustrates a block diagram of the configuration of a switch apparatus according to an exemplary embodiment of the present disclosure.

Referring to FIG. 10, the manipulation module 100 may include the first controller 150, a battery 151, a display 152, a plurality of sensors 153 and 154, a first lighting module 155, a first communication module 156, a haptic module 157, a first wireless charging module 158, and a first wireless charging coil 159.

The manipulation module 100 may further include a regulator, and at least one of the components forming the manipulation module 100 may receive a stable voltage (power) from the regulator.

The battery 151 may store electrical energy, and the battery 151 may provide the electrical energy to at least one of the display 152, the plurality of sensors 153 and 154, the first lighting module 155, the first communication module 156, and the haptic module 157 through the first controller 150.

The display 152 may be disposed on a top surface of the manipulation body 113 of the manipulation module 100, and receive touch inputs.

Each of the sensors 153 and 154 may be at least one of an acceleration sensor, a gyro sensor, a touch sensor, and a pressure sensor.

The first lighting module 155 may provide light on a specific portion of the manipulation module 100.

The first communication module 156 may transmit the input of the manipulation module 100 to the base module 200 using wired/wireless communications.

The haptic module 157 may generate vibration of a different pattern according to the combination of the magnitude of vibration and the duration of vibration to tactilely check whether the touch input of the manipulation module 100 is properly input.

The first wireless charging module 158 and the first wireless charging coil 159 may receive a magnetic field from the base module 200 using an electromagnetic induction phenomenon, and generate a current from the received magnetic field.

The first controller 150 may charge the battery 151 with the current received from the first wireless charging module 158, or provide the current to at least one of the display 152, the plurality of sensors 153 and 154, the first lighting module 155, the first communication module 156, and the haptic module 157.

Furthermore, the first controller 150 may receive a driver's or occupant's input from the display 152 and the plurality of sensors 153 and 154, and transmit the received input to the base module 200 through the first communication module 156.

The first controller 150 may control the display 152 and the first lighting module 155 to provide visual information to the driver or the occupant, and the first controller 150 may control the haptic module 157 to provide haptic information to the driver or the occupant.

The display 152, the plurality of sensors 153 and 154, the first lighting module 155, the first communication module 156, and the haptic module 157 may be disposed in the cavity of the holder 111 of the manipulation case 110. The battery 151, the first wireless charging module 158, and the first wireless charging coil 159 may be disposed in the cavity of the lower cover 112 of the manipulation case 110. The first controller 150 may be provided on the PCB 115.

Referring to FIG. 10, the base module 200 may include the second controller 250, a regulator 251, a function switch 252, a CAN communication module 253, a second lighting module 254, a second communication module 255, a second wireless charging module 256, a second wireless charging coil 257, and a plurality of ports 261, 262, 263, and 264.

The regulator 251 may provide a stable voltage of a predetermined level to at least one of the function switch 252, the CAN communication module 253, the second lighting module 254, the second communication module 255, the second wireless charging module 256, and the second controller 250.

The function switch 252 may include a switch required to control the apparatuses/systems mounted in the vehicle or a switch required to select one of functions of the switch apparatus according to an exemplary embodiment of the present disclosure.

The CAN communication module 253 may transmit and receive data, information, and signals to or from in-vehicle electronic apparatuses.

The second lighting module 254 may provide light on a specific portion of the base module 200. For example, the second lighting module 254 may provide light on a portion of a top surface of the base case 210 of the base module 200 to which the manipulation module 100 is attached.

The second communication module 255 may transmit and receive data, information, and signals to or from the first communication module 156 of the manipulation module 100. Here, wireless communications such as Bluetooth, Near Field Communications (NFC), and Wi-Fi may be used, and/or wired communications such as serial communications may be used.

The second wireless charging module 256 and the second wireless charging coil 257 may generate a magnetic field through the second controller 250.

The second controller 250 may transmit the driver's or occupant's input received from the function switch 252 and the data and signals of the in-vehicle electronic apparatuses received from the CAN communication module 253 to the manipulation module 100, or may transmit the driver's or occupant's input received from the function switch 252 and information related to the driver's or occupant's manipulation of the manipulation module 100 to the in-vehicle electronic apparatuses.

Furthermore, the second controller 250 may transmit the data, information, and signals received from the manipulation module 100 to the in-vehicle electronic apparatuses through the CAN communication module 253. The second controller 250 may be provided on the PCB 215.

When the manipulation module 100 comes close to or is attached to the base module 200 (that is, a distance between the base module 200 and the manipulation module 100 is less than or equal to a predetermined distance), the second controller 250 may control the second wireless charging module 256 to generate a magnetic field from the second wireless charging coil 257.

The plurality of ports 261, 262, 263, and 264 may include a power terminal 261, an ignition information receiving terminal 262, a CAN communication terminal 263, and a ground terminal 264. Here, some of the plurality of ports 261, 262, 263, and 264 may be electrically connected to at least one of the regulator 251, the function switch 252, the CAN communication module 253, the second lighting module 254, the second communication module 255, and the second wireless charging module 256.

The second controller 250 may determine whether the following condition is satisfied: the releasable condition in which the manipulation module 100 is releasable from the base module 200; and the hold condition in which the manipulation module 100 remains attached to the base module 200. The second controller 250 may determine the releasable condition and the hold condition based on sensing information received from the grip force sensing unit 500 of the manipulation module 100.

As illustrated in FIG. 6, when no grip force is applied to the grip 130 or the first grip force F1 less than the predetermined threshold is applied to the grip 130, the grip 130 may not substantially be deformed and the internal conductive layer 501 and the external conductive layer 502 may be spaced from each other. Accordingly, a contact signal between the internal conductive layer 501 and the external conductive layer 502 may not be generated. The first controller 150 of the manipulation module 100 may not receive the contact signal between the internal conductive layer 501 and the external conductive layer 502. When the first controller 150 of the manipulation module 100 does not receive the contact signal between the internal conductive layer 501 and the external conductive layer 502, it may determine that the hold condition in which the manipulation module 100 remains attached to the base module 200 is satisfied. When the first controller 150 of the manipulation module 100 does not receive the contact signal, the second controller 250 of the base module 200 may also not receive the contact signal. Thus, the first controller 150 and/or the second controller 250 may determine that the hold condition in which the manipulation module 100 remains attached to the base module 200 is satisfied.

As illustrated in FIG. 7, when the second grip force F2 greater than or equal to the predetermined threshold is applied to the grip 130, the grip 130 and the elastic projections 135 and 136 may be sufficiently deformed so that the internal conductive layer 501 and the external conductive layer 502 may come into contact with each other. Accordingly, a contact signal between the internal conductive layer 501 and the external conductive layer 502 may be generated. The contact signal may be transmitted to the PCB 115 through the auxiliary PCB 503, and the first controller 150 of the manipulation module 100 may receive the contact signal between the internal conductive layer 501 and the external conductive layer 502. When the first controller 150 of the manipulation module 100 receives the contact signal between the internal conductive layer 501 and the external conductive layer 502, it may determine that the releasable condition in which the manipulation module 100 is releasable from the base module 200 is satisfied. The first controller 150 of the manipulation module 100 may transmit the received contact signal to the second controller 250 of the base module 200 through wireless communications or wired communications. Thus, the first controller 150 and/or the second controller 250 may determine that the releasable condition in which the manipulation module 100 is releasable from the base module 200 is satisfied.

As illustrated in FIG. 8 and FIG. 9, when the external conductive layer 502 contacts with the two conductive portions 510 and 520, the first controller 150 of the manipulation module 100 may receive the contact signal indicating full contact between the internal conductive layer 501 and the external conductive layer 502, and the first controller 150 of the manipulation module 100 may transmit the received contact signal to the second controller 250 of the base module 200 through wireless communications or wired communications. Thus, the first controller 150 and/or the second controller 250 may determine that the releasable condition in which the manipulation module 100 is releasable from the base module 200 is satisfied.

As the first controller 150 and/or the second controller 250 determines whether the releasable condition or the hold condition is satisfied, the magnetic mechanism 300 may vary a magnetic force generated between the manipulation-side magnetic unit 310 and the base-side magnetic unit 320. When the first controller 150 and the second controller 250 determine that the releasable condition is satisfied, the magnetic mechanism 300 may generate the magnetic repulsion less than the predetermined reference magnetic force between manipulation-side magnetic unit 310 and the base-side magnetic unit 320. When the first controller 150 and the second controller 250 determine that the hold condition is satisfied, the magnetic mechanism 300 may generate the magnetic attraction greater than or equal to the predetermined reference magnetic force between the manipulation-side magnetic unit 310 and the base-side magnetic unit 320.

As set forth above, according to exemplary embodiments of the present disclosure, when the user wants to release the manipulation module from the base module, the user may simply apply the grip force greater than or equal to the predetermined threshold to the grip so that the manipulation module may be intuitively and easily released from the base module.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A switch apparatus, comprising:
    a base module including a base case;
    a manipulation module including a manipulation case and a grip mounted on an external circumferential surface of the manipulation case;
    a magnetic mechanism including a base-side magnetic unit provided to the base module, and a manipulation-side magnetic unit provided to the manipulation module; and
    a grip force sensing unit provided between the manipulation case and the grip,
    wherein the grip force sensing unit detects whether a grip force applied to the grip is greater than or equal to a predetermined threshold, and
    wherein the magnetic mechanism is configured to vary a magnetic force generated between the base-side magnetic unit and the manipulation-side magnetic unit in accordance with a magnitude of the grip force detected by the grip force sensing unit.

2. The switch apparatus of claim 1,
    wherein when the grip force applied to the grip is greater than or equal to the predetermined threshold, the magnetic mechanism is configured to generate a magnetic repulsion between the base-side magnetic unit and the manipulation-side magnetic unit, and
    wherein when the grip force applied to the grip is less than the predetermined threshold, the magnetic mechanism is configured to generate a magnetic attraction between the base-side magnetic unit and the manipulation-side magnetic unit.

3. The switch apparatus of claim 2, wherein at least one of the base-side magnetic unit and the manipulation-side magnetic unit includes an electromagnet.

4. The switch apparatus of claim 3,
    wherein one of the first controller and the second controller receives a signal of the grip force detected by the grip force sensing unit and determines whether or the grip force applied to the grip is greater than the predetermined threshold, to selectively activate the magnetic mechanism in accordance with a result of the determining.

5. The switch apparatus of claim 1,
    wherein the grip force sensing unit is provided between an internal circumferential surface of the grip and the external circumferential surface of the manipulation case.

6. The switch apparatus of claim 1,
    wherein the grip is made of an elastic material.

7. The switch apparatus of claim 1,
    wherein the grip force sensing unit includes an internal conductive layer attached to the external circumferential surface of the manipulation case, and an external conductive layer attached to an internal circumferential surface of the grip, and wherein the external conductive layer comes into contact with the internal conductive layer or is spaced from the internal conductive layer in accordance with the magnitude of the grip force applied to the grip.

8. The switch apparatus of claim 7, wherein the manipulation case includes a recess which is recessed from the external circumferential surface of the manipulation case to a center portion of the manipulation case, and wherein the internal conductive layer is received in the recess.

9. The switch apparatus of claim 8, wherein the grip force sensing unit further includes an auxiliary printed circuit board (PCB) attached into the recess, and wherein the internal conductive layer is provided on the auxiliary PCB.

10. The switch apparatus of claim 9, wherein the auxiliary PCB is electrically connected to a PCB of the manipulation module.

11. The switch apparatus of claim 9, wherein the auxiliary PCB is a flexible printed circuit board.

12. The switch apparatus of claim 7, wherein the grip includes a recessed surface provided in the internal circumferential surface of the grip, wherein the recessed surface is offset from the external circumferential surface of the manipulation case, and wherein the external conductive layer is attached to the recessed surface of the grip.

13. The switch apparatus of claim 12, wherein the grip further includes contact surfaces contacting with the external circumferential surface of the manipulation case, and wherein the contact surfaces include an upper contact surface connected to a top edge portion of the recessed surface in the grip, and a lower contact surface connected to a bottom edge portion of the recessed surface in the grip.

14. The switch apparatus of claim 12, wherein the grip further includes at least an elastic projection provided on a periphery of the recessed surfaces, and wherein the at least an elastic projection protrudes from the internal circumferential surface of the grip toward a manipulation body of the manipulation case.

15. The switch apparatus of claim 7, wherein the internal conductive layer includes a first conductive portion and a second conductive portion symmetrically disposed on the external circumferential surface of the manipulation case, and wherein the first conductive portion and the second conductive portion are separated from each other.

16. The switch apparatus of claim 15, wherein the first conductive portion of the internal conductive layer includes a first signal pattern and a first ground pattern, and wherein one of the first signal pattern and the first ground pattern has a zig-zag shape and another of the first signal pattern and the first ground pattern has an L-shape.

17. The switch apparatus of claim 15, wherein the second conductive portion of the internal conductive layer includes a second signal pattern and a second ground pattern, and wherein one of the second signal pattern and the second ground pattern has a zig-zag shape and another of the second signal pattern and the second ground pattern has an L-shape.

18. The switch apparatus of claim 7, wherein the external conductive layer has a band shape continuously extending along a circumferential direction of the grip.

\* \* \* \* \*